United States Patent
Morimoto et al.

(10) Patent No.: US 11,364,918 B2
(45) Date of Patent: Jun. 21, 2022

(54) NOTIFYING DEVICE AND NOTIFYING METHOD

(71) Applicant: Mitsubishi Electric Corporation, Tokyo (JP)

(72) Inventors: Takuji Morimoto, Tokyo (JP); Masanobu Osawa, Tokyo (JP); Shin Miura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/252,373

(22) PCT Filed: Jul. 13, 2018

(86) PCT No.: PCT/JP2018/026474
§ 371 (c)(1),
(2) Date: Dec. 15, 2020

(87) PCT Pub. No.: WO2020/012635
PCT Pub. Date: Jan. 16, 2020

(65) Prior Publication Data
US 2021/0261137 A1    Aug. 26, 2021

(51) Int. Cl.
*B60W 40/08* (2012.01)
*H04W 4/40* (2018.01)
*B60W 40/06* (2012.01)

(52) U.S. Cl.
CPC ............ *B60W 40/08* (2013.01); *B60W 40/06* (2013.01); *H04W 4/40* (2018.02); *B60W 2540/26* (2013.01); *B60W 2554/4041* (2020.02); *B60W 2756/10* (2020.02)

(58) Field of Classification Search
CPC combination set(s) only.
See application file for complete search history.

(56) References Cited

U.S. PATENT DOCUMENTS

| | | | |
|---|---|---|---|
| 10,235,859 B1 * | 3/2019 | Hiles | B60K 28/066 |
| 2013/0237278 A1 * | 9/2013 | Oka | H04W 48/18 |
| | | | 455/524 |
| 2016/0011001 A1 * | 1/2016 | Emory | G01C 21/3407 |
| | | | 701/465 |
| 2017/0369044 A1 | 12/2017 | Otake | |

FOREIGN PATENT DOCUMENTS

| | | |
|---|---|---|
| JP | 2008-232952 A | 10/2008 |
| JP | 2014-206785 A | 10/2014 |
| JP | 2016-081079 A | 5/2016 |
| JP | 2017-226373 A | 12/2017 |

OTHER PUBLICATIONS

International Search Report for PCT/JP2018/026474 dated Oct. 16, 2018 [PCT/ISA/210].

* cited by examiner

*Primary Examiner* — Thomas S McCormack
(74) *Attorney, Agent, or Firm* — Sughrue Mion, PLLC; Richard C. Turner (57) ABSTRACT

A notifying device predicts the position of a vehicle, on a road through which the vehicle is predicted to pass, after a lapse of the time taken for the driver to fall into an abnormal state. When the predicted position of the vehicle is included in a communication impossible area, the notifying device notifies, at the position of a point where an indication that the driver is going to fall into the abnormal state is detected, a call center terminal that the indication that the driver is going to fall into the abnormal state is detected from the driver.

7 Claims, 4 Drawing Sheets

FIG. 4B ically, a technique of providing a notification that a driver has fallen into an abnormal state in which the driver loses an ability to drive a vehicle has been proposed. For example, in Patent Literature 1, a device that, when determining that the driver of a vehicle has fallen into the abnormal state, transmits a help signal to an external device while decelerating the vehicle at a certain decelerating rate is described.

CITATION LIST

Patent Literature

Patent Literature 1: JP 2017-226373 A

SUMMARY OF INVENTION

Technical Problem

A problem with the conventional device described in Patent Literature 1 is that when a point where it is determined that the driver has fallen into the abnormal state is in a communication impossible area in which communication with any external device is impossible, a notification that the driver has fallen into the abnormal state cannot be provided.

The present disclosure is made to solve the above-mentioned problem, and it is therefore an object of the present disclosure to provide a notifying device and a notifying method capable of, even when a point where the driver of a vehicle is predicted to fall into an abnormal state is in a communication impossible area, providing a notification that there is an indication that the driver is going to fall into the abnormal state.

Solution to Problem

A notifying device according to the present disclosure includes processing circuitry to acquire position information about a vehicle; to acquire map information; to communicate with an external device via wireless communication; to predict a road through which the vehicle will move from a current position and pass, on a basis of both the acquired position information about the vehicle and the acquired map information; to detect an indication that a driver of the vehicle is going to fall into an abnormal state in which the driver loses a driving ability; to predict a time until the driver who is detected to have the indication of falling into the abnormal state falls into the abnormal state; to predict a position of the vehicle on the road, through which the vehicle is predicted to pass, after a lapse of the predicted time since the indication that the driver is going to fall into the abnormal state has been detected; to monitor a state of communication between the processing circuitry and the external device, and also predict that the road, through which the vehicle is predicted to pass, is included in a communication impossible area where communication of the processing circuitry is impossible; to notify, when the predicted position of the vehicle is included in the communication impossible area, the external device that the indication that the driver is going to fall into the abnormal state is detected from the driver, at a position of a point where the indication that the driver is going to fall into the abnormal state is detected; to predict a time at which the vehicle will exit from the communication impossible area; and to notify the external device of a renotification time which is the predicted time at which the vehicle will exit from the communication impossible area

Advantageous Effects of Invention

According to the present disclosure, the position of the vehicle, on a road through which the vehicle is predicted to pass, after a lapse of the time taken for the driver to fall into the abnormal state is predicted. Then, when the predicted position of the vehicle is included in a communication impossible area, a notification that an indication that the driver is going to fall into the abnormal state is detected from the driver is provided to the external device at the position of the point where the indication that the driver is going to fall into the abnormal state is detected. As a result, even when a point where the driver of a vehicle is predicted to fall into the abnormal state is in a communication impossible area, a notification that there is an indication that the driver is going to fall into the abnormal state can be provided.

DESCRIPTION OF EMBODIMENTS

Hereinafter, in order to explain the present disclosure in greater detail, embodiments of the present disclosure will be explained with reference to the accompanying drawings.

Embodiment 1

Figure 1:
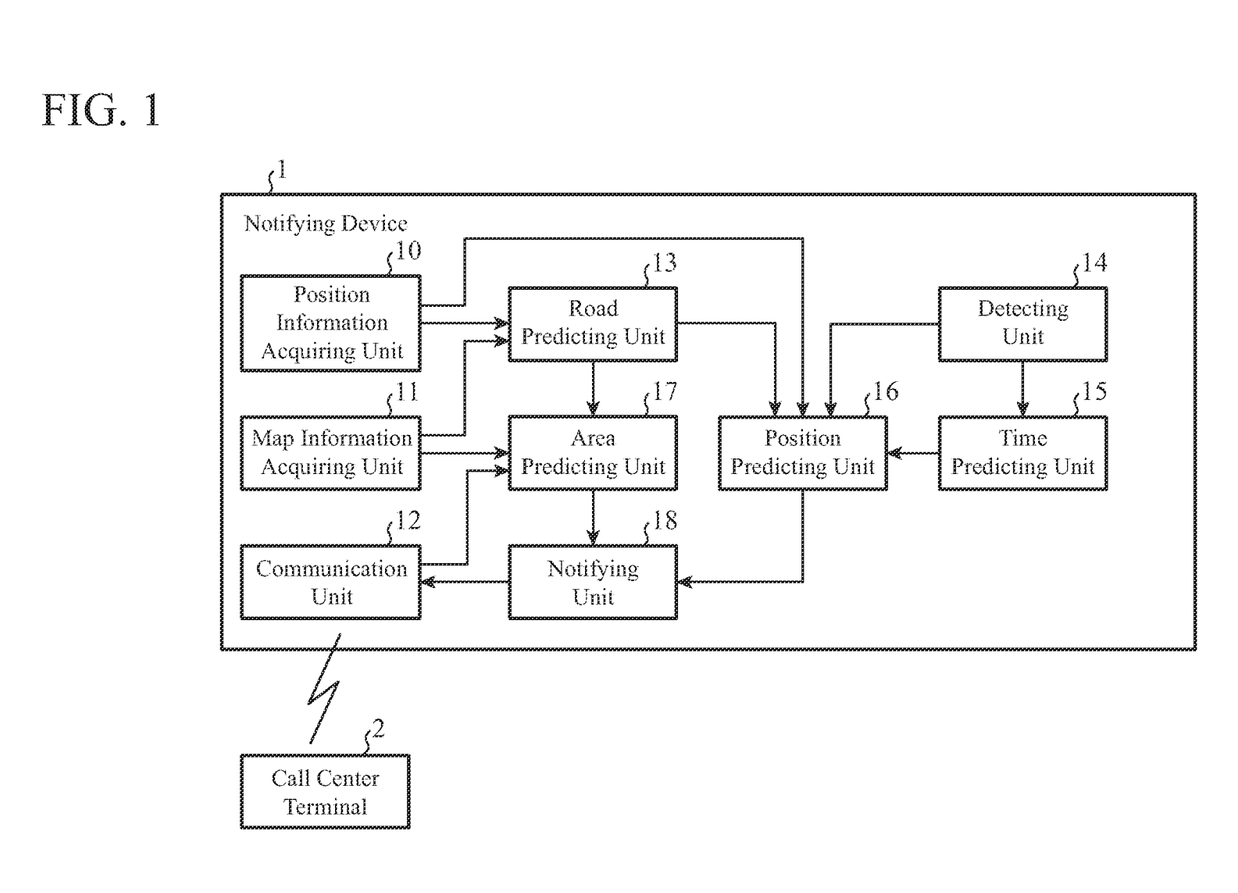
FIG. 1 is a block diagram showing the configuration of a notifying device according to Embodiment 1 of the present disclosure.

FIG. 1 is a block diagram showing the configuration of a notifying device 1 according to Embodiment 1 of the present disclosure. In FIG. 1, when detecting an indication that the driver of a vehicle is going to fall into an abnormal state, the notifying device 1 notifies a call center terminal 2 of the indication via wireless communication. The abnormal state is a state in which the driver has lost the ability to drive the vehicle. Hereinafter, a state in which there is an indication that the driver is going to fall into the abnormal state is described as a "first state", and the abnormal state into which the driver has fallen from the first state is described as a "second state."

The call center terminal 2 is an external device having a wireless communication function, and receives a notification from the notifying device 1 via wireless communication. When a notification is received by the call center terminal 2, a call center requests rescue from a fire department, a police station, or a hospital depending on the content of the notification.

The notifying device 1 includes a position information acquiring unit 10, a map information acquiring unit 11, a communication unit 12, a road predicting unit 13, a detecting unit 14, a time predicting unit 15, a position predicting unit 16, an area predicting unit 17, and a notifying unit 18. The position information acquiring unit 10 acquires position information about the current position of the vehicle in which the notifying device 1 is mounted. For example, the position information acquiring unit 10 acquires the position information about the vehicle from a positioning device that is typified by a global positioning system (GPS) receiver mounted in the vehicle. Further, the position information acquiring unit 10 may correct the position information about the vehicle by using the speed of the vehicle, the travel time of the vehicle, steering information, and map information.

The map information acquiring unit 11 acquires map information about a map including the current position of the vehicle. For example, the map information acquiring unit 11 acquires the above-mentioned map information from either a navigation device mounted in the vehicle or vehicle-mounted information equipment having a navigation function. As an alternative, the map information acquiring unit 11 may access a server that manages a database of map information and acquire the above-mentioned map information by using the communication unit 12.

The communication unit 12 communicates with the call center terminal 2 via wireless communication. For example, the communication unit 12 communicates with the call center terminal 2 by using a communication device mounted in the vehicle. This communication device a wireless communication device in which a wireless communication method capable of communicating with the call center terminal 2 is adopted. The communication unit 12 transmits notification information inputted from the notifying unit 18 to the call center terminal 2 by using the above-mentioned communication device.

The road predicting unit 13 predicts a road through which the vehicle will move from the current position and pass on the basis of both the position information about the vehicle acquired by the position information acquiring unit 10 and the map information acquired by the map information acquiring unit 11. For example, the road predicting unit 13 may predict a road through which the vehicle will pass from the current position in accordance with the route of the vehicle set in the navigation device.

Further, the road predicting unit 13 may predict a road through which the vehicle will pass on the basis of a history of the driver's past travels. For example, the road predicting unit 13 predicts that a past route extracted from the history of the driver's past travels and including the current position would be roads through which the vehicle will move from the current position and pass.

In addition, the road predicting unit 13 may predict, from road shape data of a map, that a road through which the vehicle is likely to pass would be a road through which the vehicle will move from the current position and pass.

The number of roads which the road predicting unit 13 predicts may be one or two or more.

The detecting unit 14 detects an indication that the driver is going to fall into the abnormal state in which the driver has lost the ability to drive the vehicle. For example, the detecting unit 14 performs an image analysis on the driver's image captured by a vehicle-mounted camera, and detects the first state of the driver on the basis of a result of the image analysis. Further, the detecting unit 14 may detect the first state of the driver on the basis of the driver's driving operation on the vehicle, or detect the first state of the driver on the basis of biological information which is detected from the driver by an biological sensor.

The time predicting unit 15 predicts a time until a driver, who has been detected to have an indication of falling into the abnormal state by the detecting unit 14, falls into the abnormal state. For example, the time predicting unit 15 may determine that a time preset for each type of the first state detected by the detecting unit 14 is the time which is predicted to be taken for the driver to fall into the second state. Further, the time predicting unit 15 may learn, for each driver, the time taken for the driver to fall into the second state from the first state.

For example, when a state in which the driver's eyes are closed lasts more than A (seconds) during driving, the detecting unit 14 detects that the driver is in the first state. It is considered that the first state at this time is a state in which there occurs an indication that the driver is going to be unable to drive because of the driver's drowsiness or pathological factor. When the state in which the driver's eyes are closed lasts more than A (seconds), the time predicting unit 15 predicts that B (A<B) (seconds) which is preset for this state is the time taken for the driver to fall into the second state from the first state.

It is, considered that a driver who usually blinks a lot performs frequently a behaviour such that the driver opens the eyes after the state in which the eyes are closed lasts A (seconds) and before B (seconds) elapses. Therefore, when the above-mentioned behaviour repeated a fixed number of times or more, A (seconds) which is a threshold may be set to be longer than a previous value. As a result, it is possible to reduce the possibility that a driver who usually blinks a lot and tends to have a long total eye closing time is erroneously detected as the first state by the detecting unit 14.

Further, when a state in which the vehicle is driven by the driver so that the vehicle is wobbling sideways lasts more than C (seconds), the detecting unit 14 may detect that the driver's state is the first state. When the state in which the vehicle is driven by the driver so that the vehicles wobbling sideways lasts more than C (seconds), the time predicting unit 15 predicts that D (C<D) (seconds) which is preset for this state is the time taken for the driver to fall into the second state from the first state.

A (seconds) or C (seconds) which is the threshold for detecting the first state of the driver may be a value learned for each driver. For example, the detecting unit 14 learns, for each driver, the above-mentioned threshold for detecting the first state of the driver by using driving history data about the driver. By reflecting the driver's usual driving operation in the detection of the first state, the accuracy of the detection of the first state of the driver is improved.

Further, B (seconds) or D (seconds) which is the time taken for the driver to fall into the second state from the first state may be a value learned for each driver. For example, the time predicting unit 15 learns, for each driver, the time taken for the driver to fall into the second state from the first state by using the driving history data about the driver. By reflecting the driver's usual driving operation in the prediction of the time taken for the driver to fall into the second state from the first state, the accuracy of the predicted time is improved.

The detecting unit 14 may calculate a likelihood that the driver falls into the second state on the basis of the speed of the vehicle, the degree to which the vehicles wobbling sideways, and the degree to which the driver's eyes are closed, and, when this likelihood is equal to or greater than a threshold E, detect that the driver is in the first state. The degree to which the traveling vehicle is wobbling sideways is, for example, the frequency per unit time with which the vehicle has wobbled sideways, and the degree to which the driver's eyes are closed is, for example, the sum total of time periods during each of which the driver's eyes have been closed. A typical statistical method or a typical machine learning method may be used for the calculation of the above-mentioned likelihood. When the above-mentioned likelihood is equal to or greater than the threshold E, the time predicting unit 15 predicts that F (E<F) (seconds) which is preset for this state is the time taken for the driver to fall into the second state from the first state.

Further, the detecting unit 14 may assign weights to multiple factors for detecting that the driver is in the first state, and learn a likelihood that the driver changes from the first state to the second state on the basis of the multiple factors to which the weights are assigned. The multiple factors are, for example, the speed of the vehicle, the degree to which the vehicle is wobbling sideways, and the degree to which the driver's eyes are closed.

For example, drivers who are not good at driving usually drive a vehicle to wobble sideways in many cases. More specifically, such a driver has a large degree to which she driver is driving the vehicle to wobble sideways even in a normal driving state, and thus it is predicted that there is a small change in the degree of wobbling even when the driver falls into the second state. Accordingly, the detecting unit 14 reduces the weight for the degree to which the vehicle is wobbling sideways, and learns the above-mentioned likelihood. As a result, the driver's usual driving operation can be reflected in the learning of the above-mentioned likelihood.

The threshold E for the above-mentioned likelihood used for the detection of the first state of the driver may be a value learned for each driver. For example, the detecting unit 14 learns the threshold E for the above-mentioned likelihood for each driver by using data about the multiple factors. As a result, the driver's usual driving operation can be reflected in the learning of the threshold for the above-mentioned likelihood.

In addition, the time predicting unit 15 may learn, for each driver, the predicted time F (seconds) taken for the driver to fall into the second state from the first state, by using the data about the multiple factors. As a result, the driver's usual driving operation can be reflected in the prediction of the time taken for the driver so fall into the second state from the first state.

Further, the detecting unit 14 may detect whether or not the driver is in the first state and whether or not the driver is in the second state by using different detecting methods. For example, the detecting unit 14 detects the first state of the driver on the basis of either movements of the driver is head or shakes in the driver's steering operation. When the driver's eyes are completely closed, the detecting unit 14 detects that the driver has fallen into the second state from the first state.

A threshold used for the detection of the first state of the driver may be a value learned for each driver. For example, the detecting unit 14 learns the above-mentioned threshold for each driver by using data indicating either movements of the driver's head or shakes in the driver's steering operation. As a result, the driver's usual scene in the vehicle cabin can be reflected in the learning of the above-mentioned threshold.

In addition, the time predicting unit 15 may learn, for each driver, the time taken for the driver to fall into the second state from the first state by using the data indicating either movements of the driver's head or shakes in the driver's steering operation. As a result, the driver's usual state in the vehicle cabin can be reflected in the prediction of the time taken for the driver to fall into the second state from the first state.

The position predicting unit 16 predicts the position of the vehicle on a road through which the vehicle is predicted to pass by the road predicting unit 13 after a lapse of the time predicted by the time predicting unit 15 since the driver has been detected to be in the first state by the detecting unit 14. For example, the position predicting unit 16 predicts the position where the vehicle is present after a lapse of the time predicted by the time predicting unit 15, out of positions on a road through which the vehicle is predicted to pass by the road predicting unit 13, on the basis of vehicle information acquired from a vehicle-mounted electronic control device. The speed of the vehicle is included in the vehicle information.

The area predicting unit 17 monitors a state of communication between the communication unit 12 and the call center terminal 2, and also predicts that a road through which the vehicle is predicted to pass by the road predicting unit 13 is included in a communication impossible area where communication of the communication unit 12 is impossible. For example, the area predicting unit 17 predicts a communication impossible area in which a road through which the vehicle is predicted to pass is included, on the basis of a communication area map of an area where the vehicle is present.

The area predicting unit 17 may predict a communication impossible area in which a road through which the vehicle is predicted to pass is included, on the basis of data about a history of past establishment of communication of the communication unit 12. As an alternative, the area predicting unit 17 may predict a communication impossible area in which a road through which the vehicle is predicted to pass is included, on the basis of the current intensity of communication by the communication unit 12. For example, when the communication intensity decreases as the vehicle travels, the area predicting unit 17 predicts that there is a communication impossible area in the traveling direction of the vehicle.

Further, the area predicting unit 17 may determine that a specific area where the vehicle is predicted to pass is a communication impossible area, on the basis of the position information about the vehicle and map information. For example, the specific area is a tunnel. In this case, by presetting tunnels as communication impossible areas, the processing load is reduced as compared with the case in which the process of specifying a communication impossible area from the communication intensity is performed.

When the position of the vehicle predicted by the position predicting unit 16 is included communication impossible area, the notifying unit 18 notifies, at the position of a point where the first state of the driver is detected by the detecting unit 14, the call center terminal 2 that the driver is in the first state by using the communication unit 12. As a result, even though a point where the driver is predicted to fall into the abnormal state is in a communication impossible area, a notification that there is an indication that the driver is going to fall into the second state can be provided.

Further, the notifying unit 18 may notify the call center terminal 2 of the position of the vehicle predicted by the position predicting unit 16, in addition to information indicating that the driver is in the first state. When multiple positions are predicted by the position predicting unit 16, the notifying unit 18 provides a notification for the call center terminal 2 as long as at least one of these positions is included in a communication impossible area.

Next, the operations will be explained.

Figure 2:
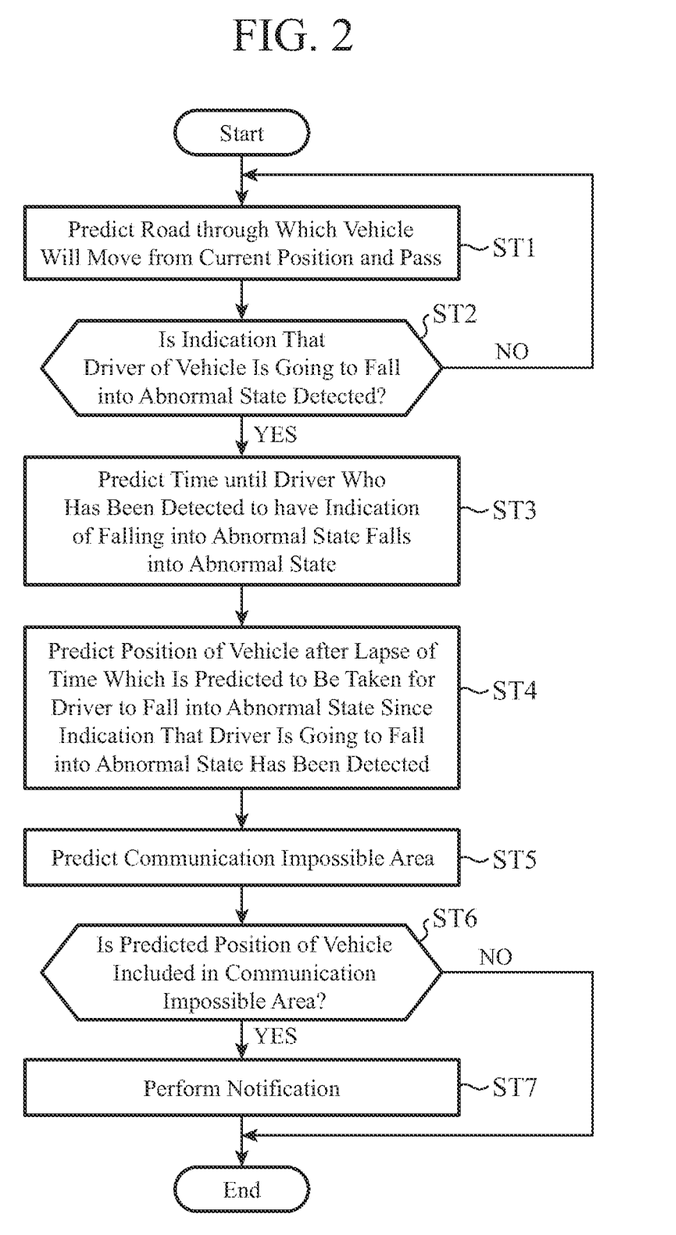
FIG. 2 is a flowchart showing a notifying method according to Embodiment 1.

FIG. 2 is a flowchart showing a notifying method according to Embodiment 1.

The road predicting unit 13 predicts a road through which the vehicle will move from the current position and pass, on the basis of both the position information about the vehicle acquired by the position information acquiring unit 10 and the map information acquired by the map information acquiring unit 11 (step ST1). Information about the road through which the vehicle is predicted to pass by the road predicting unit 13 is outputted to the position predicting unit 16 and the area predicting unit 17.

The detecting unit 14 performs the process of detecting an indication that the driver of the vehicle is going to fall into the abnormal state in which the driver loses the driving ability. At this time, the time predicting unit 15 checks whether or not the driver has been detected to be in the first state by the detecting unit 14 (step ST2). When the driver is not detected to be in the first state (NO in step ST2), the processing returns to step ST1.

When the driver is detected to be in the first state by the detecting unit 14 (YES in step ST2), the time predicting unit 15 predicts the time taken for the driver to fall into the second state from the first state (step ST3). For example, the time predicting unit 15 sets the time preset for each type of the first state of the driver as the time which is predicted to be taken for this driver to fall into the second state.

The position predicting unit 16 predicts the position of the vehicle on a road through which the vehicle is predicted to pass by the road predicting unit 13 after a lapse of the time predicted by the time predicting unit 15 since the driver has been detected to be in the first state by the detecting unit 14 (step ST4). For example, the position predicting unit 16 predicts the position where the vehicle is present after a lapse of the time predicted by the time predicting unit 15, out of positions on a road through which the vehicle is predicted to pass, on the basis of the speed information about the vehicle.

The area predicting unit 17 predicts a communication impossible area where communication of the communication unit 12 is impossible and which includes a road through which the vehicle is predicted to pass by the road predicting unit 13 (step ST5). For example, when the intensity of communication between the communication unit 12 and the call center terminal 2 decreases as the vehicle travels, the area predicting unit 17 predicts that there is a communication impossible area in the traveling direction of the vehicle.

Further, the area predicting unit 17 may predict that a tunnel through which the vehicle is predicted to pass is a communication impossible area, on the basis of the position information about the vehicle and map information.

Next, the notifying unit 18 checks whether or not a road through which the vehicle is predicted to pass by the road predicting unit 13 is included in a communication impossible area predicted by the area predicting unit 17 (step ST6). Here, because when a road through which the vehicle is predicted to pass is not included in any communication impossible area (NO in step ST6), the vehicle will not pass through any area where the transmission of a notification to the call center terminal 2 cannot be performed, the series of processes of FIG. 2 is ended.

In contrast, when a road through which the vehicle is predicted to pass is included in a communication impossible area (YES in step ST6), the notifying unit 18 notifies, at the position of a point where the first state of the driver is detected by the detecting unit 14, the call center terminal 2 that the driver is in the first state by using the communication unit 12 (step ST7). When the point where the first state of the driver is detected is in a communication impossible area, the notifying unit 18 repeatedly performs a notification to the call center terminal 2 while the vehicle is traveling. When the vehicle exits from the communication impossible area, the notifying unit 18 can notify the call center terminal 2 that the driver is in the first state.

Further, the notifying unit 18 may notify the call center terminal 2 of the position of the vehicle predicted by the position predicting unit 16, in addition to information indicating that the driver is in the first state. As a result, because a notification of the point where there is a possibility that the driver has fallen into the abnormal state and thereby has stopped the vehicle or caused an accident is provided for the call center, the call center can request rescue of the driver.

As mentioned above, the notifying device 1 according to Embodiment 1 predicts the position of the vehicle, on a road through which the vehicle is predicted to pass, after a lapse of the time taken for the driver to fall into the second state. Then, when the predicted position of the vehicle is included in a communication impossible area, the notifying device 1 notifies, at the position of a point where the first state of the driver is detected, the call center terminal 2 that the first state is detected from the driver. As a result, even though the point where the driver of the vehicle is predicted to fall into the second state is in a communication impossible area, a notification that there is an indication that the driver is going to fall into the second state can be provided for the call center terminal 2. The call center receives the notification in a stage in which there is an indication that the driver is going to fall into the second state, thereby being able to request a fire department, a police station, or a hospital to rescue the driver when a certain time (time taken for the driver to fall into the second state from the first state) elapses since the notification.

The notifying method according to Embodiment 1 makes it possible to notify the call center terminal 2 that there is an indication that the driver is going to fall into the second state, even though the point where the driver of the vehicle is predicted to fall into the second state is in a communication impossible area, by performing the processing shown in FIG. 2.

Embodiment 2

Figure 3:
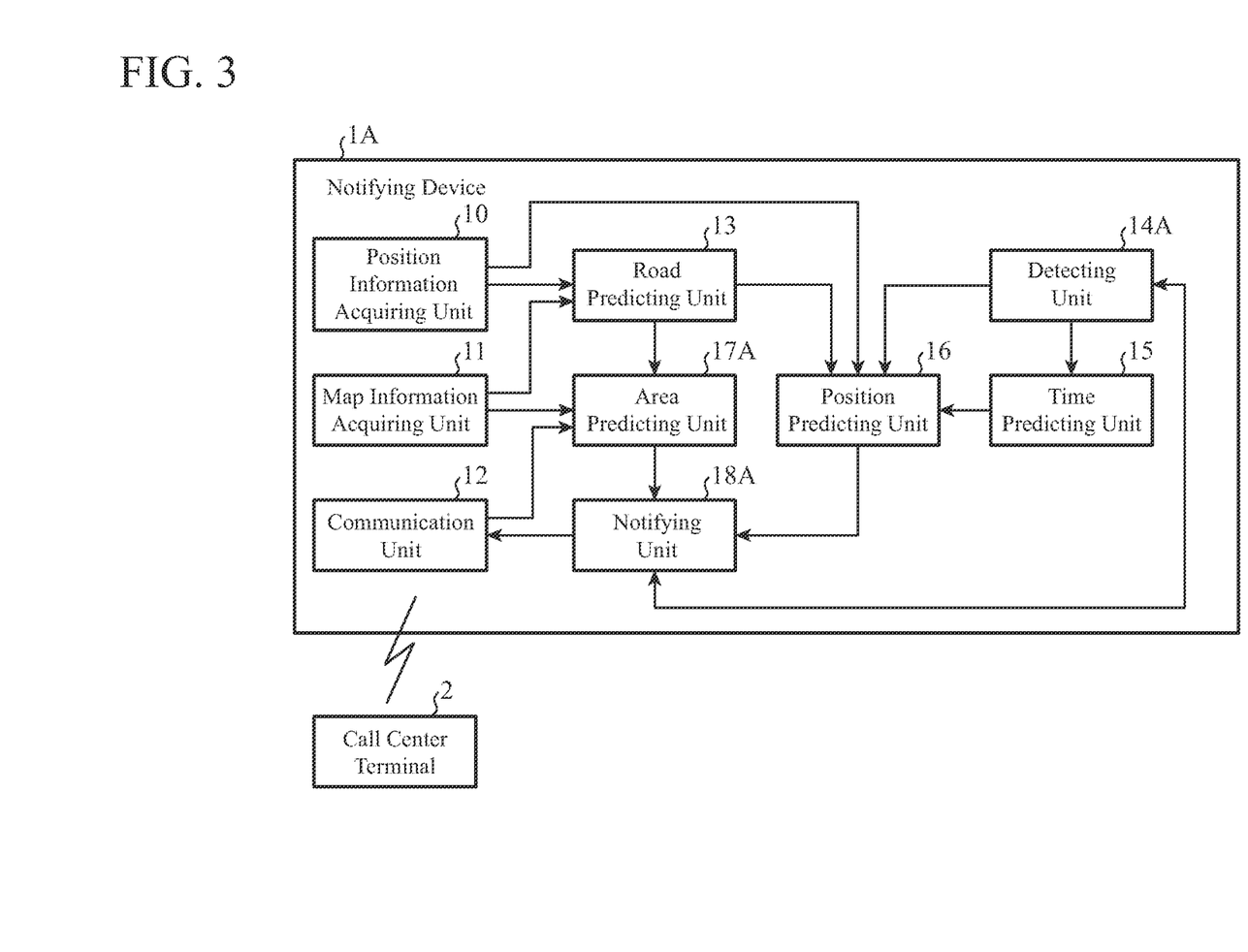
FIG. 3 is a block diagram showing the configuration of a notifying device according to Embodiment 2 of the present disclosure.

FIG. 3 is a block diagram showing the configuration of a notifying device 1A according to Embodiment 2. In FIG. 3, the same components as those shown in FIG. 1 are denoted by the same reference signs, and an explanation of the components will be omitted hereinafter. The notifying device 1A provides a notification for a call center terminal 2 via wireless communication when detecting a first state of the driver of a vehicle, like that of Embodiment 1. The notifying device 1A includes a position information acquiring unit 10, a map information acquiring unit 11, a communication unit 12, a road predicting unit 13, a detecting unit 14A, a time predicting unit 15, a position predicting unit 16, an area predicting unit 17A, and a notifying unit 18A.

The detecting unit 14A detects the first state of the driver in the same way as that of Embodiment 1, and also detects whether or not a second state of the driver has been removed. For example, the detecting unit 14A may perform an image analysis on the driver's image captured by a vehicle-mounted camera, and detect whether or not the second state of the driver has been removed on the basis of a result of the image analysis. Further, the detecting unit 14A may detect whether or not the second state of the driver has been removed on the basis of the driver's driving operation on the vehicle, or detect whether or not the second state of the driver has been removed on the basis of biological information which is detected from the driver by biological sensor.

The area predicting unit 17A predicts a communication impossible area including a road through which the vehicle is predicted to pass, in the same way as that of Embodiment 1, and also predicts the time at which the vehicle will exit from the communication impossible area. For example, the area predicting unit 17A predicts the time at which the vehicle will exit from the communication impossible area on the basis of vehicle information including the vehicle speed. The time at which the vehicle will exit from the communication impossible area is a renotification time.

The notifying unit 18A notifies the call center terminal 2 of the renotification time predicted by the area predicting unit 17A. Further, when the second state of the driver has been removed at the renotification time, the notifying unit 18A notifies the call center terminal 2 that the second state of the driver has been removed, by using the communication unit 12.

As mentioned above, in the notifying device 1A according to Embodiment 2, the area predicting unit 17A predicts the time at which the vehicle will exit from a communication impossible area. The notifying unit 18A notifies the call center terminal 2 of the renotification time which is the time predicted by the area predicting unit 17A.

As a result, a call center can request a fire department, a police station, or a hospital to rescue the driver when the vehicle has exited from the communication impossible area and thereby communication with the communication unit 12 becomes possible. On the basis of the driver's state which the call center terminal 2 receives from the communication unit 12, the call center can change the timing of the dispatch of the rescue depending on the driver's state.

In the notifying device 1A according to Embodiment 2, the detecting unit 14A detects whether or not the second state of the driver has been removed. When the second state of the driver has been removed at the renotification time, the notifying unit 18A notifies the call center terminal 2 that the second state of the driver has been removed, by using the communication unit 12. As a result, when the second state of the driver has been removed before the renotification time, the call center can cancel the rescue dispatch for the driver.

Next, a hardware configuration for implementing the functions of the notifying device 1 according to Embodiment 1 and the functions of the notifying device 1A according to Embodiment 2 will be explained.

The functions of the position information acquiring unit 10, the map information acquiring unit 11, the communication unit 12, the road predicting unit 13, the detecting unit 14, the time predicting unit 15, the position predicting unit 16, the area predicting unit 17, and the notifying unit 18 which are included in the notifying device 1 are implemented by a processing circuit. More specifically, the notifying device 1 includes a processing circuit for performing the processes of steps ST1 to ST7 shown in FIG. 2. The processing circuit may be either hardware for exclusive use or a central processing unit (CPU) that executes a program stored in a memory.

Similarly, the functions of the position information acquiring unit 10, the map, information acquiring unit 11, the communication unit 12, the road predicting unit 13, the detecting unit 14A, the time predicting unit 15, the position predicting unit 16, the area predicting unit 17A, and the notifying unit 18A which are included in the notifying device 1A are implemented by a processing circuit.

Figure 4A:
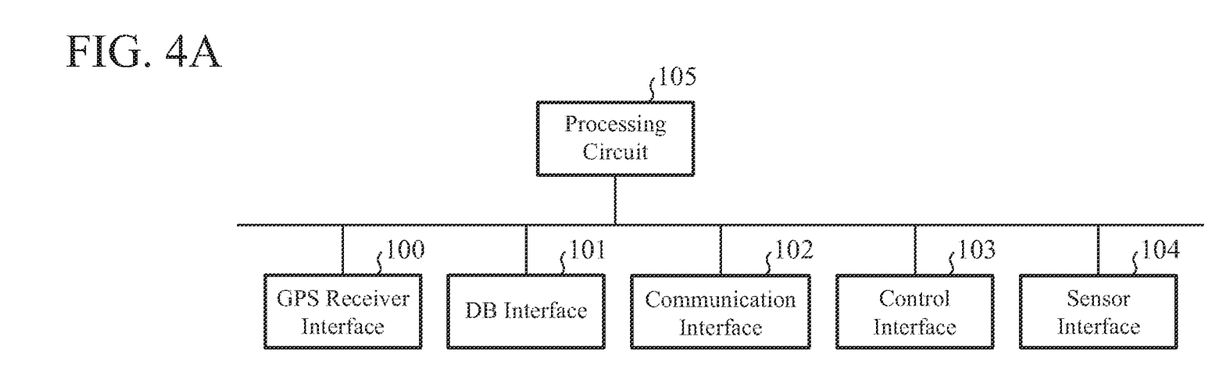
FIG. 4A is a block diagram showing a hardware configuration for implementing the functions of each of the notifying devices according to Embodiments 1 and 2.
Figure 4B:
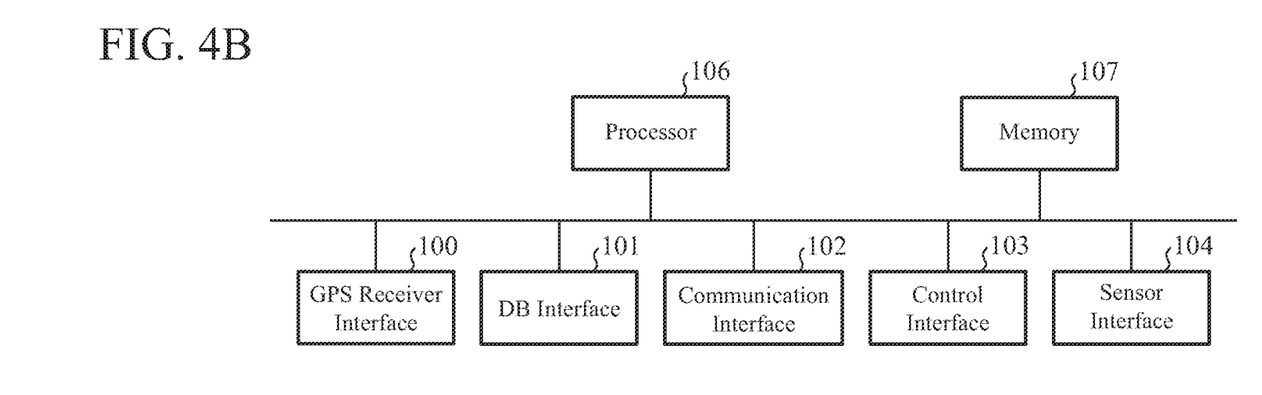
FIG. 4B is a block diagram showing a hardware configuration executing software implementing the functions of each of the notifying devices according to Embodiments 1 and 2.

FIG. 4A is a block diagram showing a hardware configuration for implementing the functions of each of the notifying devices 1 and 1A. FIG. 4B is a block diagram showing a hardware configuration for executing software that implements the functions of each of the notifying devices 1 and 1A. In FIGS. 4A and 4B, a GPS receiver interface 100 relays GPS information from a GPS receiver mounted in the vehicle. The position information acquiring unit 10 acquires the GPS information which is the position information about the vehicle from the GPS receiver via the GPS receiver interface 100.

A DB interface 101 relays map information from a map database. The map database may be included in a navigation device mounted in the vehicle, or may be a database on the cloud. The map information acquiring unit 11 acquires map information about a map including the position of the vehicle from the map database via the DB interface 101. A communication interface 102 relays information transmitted and received by a vehicle-mounted wireless communication device. The communication unit 12 outputs notification information inputted from the notifying unit 18 or the notifying unit 18A so she wireless communication device via the communication interface 102. The wireless communication device establishes a communication connection with the call center terminal 2, and transmits the notification information.

A control interface 103 relays vehicle information from an electronic control device mounted in the vehicle. For example, each of the detecting units 14 and 14A acquires the vehicle information from the electronic control device via the control interface 103. Each of the detecting units 14 and 14A detects the first state of the driver by using the vehicle information acquired from the electronic control device.

Further, the position predicting unit 16 acquires the vehicle information including the speed of the vehicle from the electronic control device via the control interface 103. The position predicting unit 16 predicts the position of the vehicle after a lapse of the time predicted by the time predicting unit 15, by using the vehicle information acquired from the electronic control device.

A sensor interface 104 relays detection information from either the vehicle-mounted camera or the biological sensor which is mounted in the vehicle. Each of the detecting units 14 and 14A acquires the detection information from the vehicle-mounted camera or the biological sensor via the sensor interface 104. Each of the detecting units 14 and 14A detects the first state of the driver by using the detection information acquired from the vehicle-mounted camera or the biological sensor.

In the case in which the processing circuit is a processing circuit 105 shown in FIG. 4A which is hardware for exclusive use, the processing circuit 105 is, for example, a single circuit, a composite circuit, a programmable processor, a parallel programmable processor, an application specific integrated circuit (ASIC), a field-programmable gate array (FPGA) or a combination thereof. The functions of the position information acquiring unit 10, the map information acquiring unit 11, the communication unit 12, the road predicting unit 13, the detecting unit 14, the time predicting unit 15, the position predicting unit 16, the area predicting unit 17, and the notifying unit 18 which are included in the notifying device 1 may be implemented by two or more processing circuits, or these functions may be implemented collectively by a single processing circuit. The same goes for the position information acquiring unit 10, the map information acquiring unit 11, the communication unit 12, the road predicting unit 13, the detecting unit 14A, the time predicting unit 15, the position predicting unit 16, the area predicting unit 17A, and the notifying unit 18A which are included in the notifying device 1A.

In the case in which the processing circuit is a processor 106 shown in FIG. 4B, the functions of the position information acquiring unit 10, the map information acquiring unit 11, the communication unit 12, the road predicting unit 13, the detecting unit 14, the time predicting unit 15, the position predicting unit 16, the area predicting unit 17, and the notifying unit 18 which are included in the notifying device 1 are implemented by software, firmware, or a combination of software and firmware. The software or the firmware is described as a program and the program is stored in a memory 107. The same goes for the position information acquiring unit 10, the map information acquiring unit 11, the communication unit 12, the road predicting unit 13, the detecting unit 14A, the time predicting unit 15, the position predicting unit 16, the area predicting unit 17A, and the notifying unit 18A which are included in the notifying device 1A.

The processor 106 implements the functions of the position information acquiring unit 10, the map information acquiring unit 11, the communication unit 12, the road predicting unit 13, the detecting unit 14, the time predicting unit 15, the position predicting unit 16, the area predicting unit 17, and the notifying unit 18 by reading and executing programs stored in the memory 107. More specifically, the notifying device 1 includes the memory 107 for storing the programs by which the processes of steps ST1 to ST7 shown in FIG. 2 are performed as a result when the programs are executed by the processor 106.

These programs cause a computer to perform procedures or methods which the position information acquiring unit 10, the map information acquiring unit 11, the communication unit 12, the road predicting unit 13, the detecting unit 14, the time predicting unit 15, the position predicting unit 16, the area predicting unit 17, and the notifying unit 18 have. The memory 107 may be a computer readable storage medium in which the programs for causing the computer to function as the position information acquiring unit 10, the map information acquiring unit 11, the communication unit 12, the road predicting unit 13, the detecting unit 14, the time predicting unit 15, the position predicting unit 16, the area predicting unit 17, and the notifying unit 18 are stored.

The same goes for the position information acquiring unit 10, the map information acquiring unit 11, the communication unit 12, the road predicting unit 13, the detecting unit 14A, the time predicting unit 15, the position predicting unit 16, the area predicting unit 17A, and the notifying unit 18A which are included in the notifying device 1A.

The memory 107 is, for example, a non-volatile or volatile semiconductor memory, such as a random access memory (RAM), a read only memory (ROM), a flash memory, an erasable programmable read only memory (ROM), and an electrically EPROM (EEPROM), a magnetic disc, a flexible disc, an optical disc, a compact disc, a mini disc, a DVD, or the like.

A part of the functions of the position information acquiring unit 10, the map information acquiring unit 11, the communication unit 12, the road predicting unit 13, the detecting unit 14, the time predicting unit 15, the position predicting unit 16, the area predicting unit 17, and the notifying unit 18 may be implemented by hardware for exclusive use, and another part of the functions may be implemented by software or firmware. For example, the functions of the position information acquiring unit 10, the map information acquiring unit 11, and the communication unit 12 are implemented by the processing circuit which is hardware for exclusive use, and the functions of the road predicting unit 13, the detecting unit 14, the time predicting unit 15, the position predicting unit 16, the area predicting unit 17, and the notifying unit 18 are implemented by the processor 106's reading and executing programs stored in the memory 107. In this way, the processing circuit can implement the above-mentioned functions by using hardware, software, firmware, or a combination of hardware, software, and firmware.

The same goes for the position information acquiring unit 10, the map information acquiring unit 11, the communication unit 12, the road predicting unit 13, the detecting unit 14A, the time predicting unit 15, the position predicting unit 16, the area predicting unit 17A, and the notifying unit 18A which are included in the notifying device 1A.

It is to be understood that the present disclosure is not limited to the above-mentioned embodiments, and any combination of two or more of the embodiments can be made, changes can be made in any component according to the embodiments, or any component according to the embodiments can be omitted within the scope of the present disclosure.

INDUSTRIAL APPLICABILITY

Even when a point where the driver of a vehicle is predicted to fall into the abnormal state is in a communication impossible area, the notifying device according to the present disclosure can provide a notification that there is an indication that the driver is going to fall into the abnormal state. Thus, the notifying device can be used for, for example, a help network system that rescues the drivers of vehicles.

REFERENCE SIGNS LIST 1, 1A notifying device, 2 call center terminal, 10 position information acquiring unit, 11 map information acquiring unit, 12 communication unit, 13 road predicting unit, 14, 14A detecting unit, 15 time predicting unit, 16 position predicting unit, 17, 17A area predicting unit, 18, 18A notifying unit, 100 GPS receiver interface, 101 DB interface, 102 communication interface, 103 control interface, 104 sensor interface, 105 processing circuit, 106 processor, and 107 memory.

The invention claimed is:

1. A notifying device comprising:
processing circuitry configured to:
acquire position information about a vehicle;
acquire map information;
communicate with an external device via wireless communication;
predict a road through which the vehicle will move from a current position based on the acquired position information about the vehicle and the acquired map information;
detect an indication that a driver of the vehicle is going to fall into an abnormal state in which the driver loses a driving ability;
predict a time at which the driver will fall into the abnormal state based on the detected indication of the driver falling into the abnormal state;
predict a position of the vehicle on the road after a lapse of the predicted time since from a time at which the indication that the driver is going to fall into the abnormal state is detected;
monitor a state of communication between the processing circuitry and the external device, and predict that the road, through which the vehicle is predicted to pass, is included in an area where the communication with the external device not possible;
notify, when the predicted position of the vehicle is included in the area, the external device that the indication that the driver is going to fall into the abnormal state is detected, the indication including information about a position of a point where the indication that the driver is going to fall into the abnormal state is detected;
predict a time at which the vehicle will exit from the area; and
notify the external device of a renotification time which is the predicted time at which the vehicle will exit from the area.

2. The notifying device according to claim 1, wherein the processing circuitry detects whether or not the abnormal state of the driver has been removed, and
when the abnormal state of the driver has been removed at the renotification time, the processing circuitry notifies the external device that the abnormal state of the driver has been removed.

3. The notifying device according to claim 1, wherein at the position of the point where the indication that the driver is going to fall into the abnormal state is detected, the processing circuitry notifies the external device of the predicted position of the vehicle.

4. The notifying device according to claim 1, wherein the area is a tunnel.

5. A notifying method for a notifying device including processing circuitry communicating with an external device via wireless communication, the method comprising:
acquiring position information about a vehicle;
acquiring map information;
predicting a road through which the vehicle will move from a current position based on the acquired position information about the vehicle and the acquired map information;
detecting an indication that a driver of the vehicle is going to fall into an abnormal state in which the driver loses a driving ability;
predicting a time at which the driver will fall into the abnormal state based on the detected indication of the driver falling into the abnormal state;
predicting a position of the vehicle on the road after a lapse of the predicted time from a time at which the indication that the driver is going to fall into the abnormal state is detected;
monitoring a state of communication between the processing circuitry and the external device, and predicting that the road, through which the vehicle is predicted to pass, is included an area where the communication with the external device is not possible;
notifying, when the predicted position of the vehicle is included in the area, the external device that the indication that the driver is going to fall into the abnormal state is detected, the indication including information about a position of a point where the indication that the driver is going to fall into the abnormal state is detected;
predicting a time at which the vehicle will exit from the area; and
notifying the external device of a renotification time which is the predicted time at which the vehicle will exit from the area.

6. The notifying device according to claim 2, wherein the area is a tunnel.

7. The notifying device according to claim 3, wherein the area is a tunnel.

* * * * *